United States Patent

Dubinsky et al.

(10) Patent No.: US 8,875,111 B2
(45) Date of Patent: Oct. 28, 2014

(54) INTERMEDIATE LANGUAGE REPRESENTATION AND MODIFICATION

(75) Inventors: Leon Dubinsky, Redmond, WA (US); John Lyon-Smith, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1235 days.

(21) Appl. No.: 12/428,489

(22) Filed: Apr. 23, 2009

(65) Prior Publication Data
US 2010/0275188 A1  Oct. 28, 2010

(51) Int. Cl.
- G06F 9/45 (2006.01)
- G06F 9/455 (2006.01)
- G06F 9/44 (2006.01)
- G06F 11/36 (2006.01)

(52) U.S. Cl.
CPC .............. *G06F 9/45516* (2013.01); *G06F 8/34* (2013.01); *G06F 11/3644* (2013.01)
USPC .......................................... 717/144; 717/136

(58) Field of Classification Search
CPC .............................................. G06F 8/34–8/40
USPC ......... 717/101–178; 703/6, 22; 715/771–772; 718/102; 711/147; 716/103; 702/108, 702/125
See application file for complete search history.

(56) References Cited

U.S. PATENT DOCUMENTS

| | | | | |
|---|---|---|---|---|
| 5,555,417 A * | 9/1996 | Odnert et al. | ................. | 717/159 |
| 5,598,560 A | 1/1997 | Benson | | |
| 5,613,117 A | 3/1997 | Davidson et al. | | |
| 5,971,596 A * | 10/1999 | Nishikawa | .................... | 716/112 |
| 6,151,706 A * | 11/2000 | Lo et al. | ......................... | 717/155 |
| 6,546,550 B1 * | 4/2003 | Ogata et al. | .................... | 717/148 |
| 6,625,797 B1 * | 9/2003 | Edwards et al. | ............... | 716/103 |
| 6,662,354 B1 * | 12/2003 | Krablin et al. | ................ | 717/140 |
| 6,738,967 B1 * | 5/2004 | Radigan | ........................ | 717/146 |
| 6,851,108 B1 | 2/2005 | Syme et al. | | |
| 6,971,091 B1 * | 11/2005 | Arnold et al. | ................. | 717/145 |
| 7,120,898 B2 | 10/2006 | Grover et al. | | |
| 7,293,261 B1 | 11/2007 | Anderson et al. | | |
| 7,409,679 B2 * | 8/2008 | Chedgey et al. | .............. | 717/144 |
| 7,493,604 B2 | 2/2009 | Mariani | | |
| 7,669,193 B1 * | 2/2010 | Chipman | ...................... | 717/152 |
| 7,707,562 B1 * | 4/2010 | Kaltenbach | .................... | 717/136 |

(Continued)

OTHER PUBLICATIONS

Creating Semantic Representations of Diagrams—Mark Minas Lehrstuhl fur Programmiersprachen Universitat Erlangen-Nurnberg Martensstr. 3, 91058 Erlangen, Germany—AGTIVE ' 99, LNCS 1779, pp. 209-224, 2000—Springer-Verlag Berlin Heidelberg 2000.*

(Continued)

*Primary Examiner* — Jason Mitchell
*Assistant Examiner* — Francisco Aponte
(74) *Attorney, Agent, or Firm* — Kevin Sullivan; Kate Drakos; Micky Minhas

(57) ABSTRACT

A system and method for facilitating analysis and modification of a computer program. A directed graph is generated from an intermediate language representation of a computer program function, with a node representing each instruction. Meta-edges or meta-nodes are inserted into the directed graph to facilitate location of instruction nodes. One type of meta-edge is a back edge that identifies branch instruction nodes. Some meta-nodes may identify instructions of a specific type. Some meta-nodes may identify exception blocks and corresponding handlers. Analysis of a program function may include insertion of new instructions prior to execution of the function.

19 Claims, 6 Drawing Sheets

(56) References Cited

U.S. PATENT DOCUMENTS

| | | | |
|---|---|---|---|
| 8,046,202 B1* | 10/2011 | Yang et al. .................... 703/6 |
| 8,046,751 B1* | 10/2011 | Avadhanula et al. ......... 717/156 |
| 2003/0067481 A1* | 4/2003 | Chedgey et al. ............. 345/738 |
| 2004/0088689 A1* | 5/2004 | Hammes ....................... 717/154 |
| 2004/0154009 A1* | 8/2004 | Reynaud ....................... 717/155 |
| 2004/0243982 A1* | 12/2004 | Robison ....................... 717/132 |
| 2004/0267760 A1 | 12/2004 | Brundage et al. |
| 2005/0166167 A1* | 7/2005 | Ivancic et al. ..................... 716/5 |
| 2005/0257194 A1* | 11/2005 | Morrow et al. .............. 717/109 |
| 2006/0064682 A1* | 3/2006 | Tanaka ......................... 717/161 |
| 2007/0089075 A1* | 4/2007 | Ward ............................... 716/4 |
| 2007/0169019 A1* | 7/2007 | Leino et al. .................. 717/136 |
| 2007/0169027 A1* | 7/2007 | Drepper ....................... 717/140 |
| 2008/0098375 A1* | 4/2008 | Isard ............................. 717/149 |
| 2008/0178149 A1* | 7/2008 | Peterson et al. ............. 717/110 |
| 2008/0288915 A1* | 11/2008 | Krablin et al. ............... 717/104 |
| 2009/0024622 A1 | 1/2009 | Chkodrov et al. |
| 2009/0094590 A1* | 4/2009 | Mendelson et al. .......... 717/156 |
| 2009/0172584 A1* | 7/2009 | Hassan et al. ................ 715/772 |
| 2009/0222249 A1* | 9/2009 | Wang et al. .................... 703/13 |
| 2009/0235262 A1* | 9/2009 | Ceze et al. .................... 718/102 |
| 2009/0254892 A1* | 10/2009 | Yamashita .................... 717/146 |
| 2010/0199257 A1* | 8/2010 | Biggerstaff .................. 717/104 |
| 2010/0251210 A1* | 9/2010 | Amaral et al. ............... 717/105 |

OTHER PUBLICATIONS

"Peli's Farm—Pex, QuickGraph, MbUnit, Reflector Addins", Retrieved at<<http://blog.dotnetwiki.org/2004/05/11/FunWithGraphs2GettingTheILExecutionGraphUsingQuickGraphAndIlReader.aspx>>, May 11, 2004, pp. 1-10.

* cited by examiner

INTERMEDIATE LANGUAGE REPRESENTATION AND MODIFICATION

TECHNICAL FIELD

The present invention relates generally to computer programming and compiling, and, more particularly, to representation and modification of intermediate language code.

BACKGROUND

A computer program is typically written in a high level language and compiled into a low level language for execution. The high level language version is referred to as source code. The low level language may be a native code that is understood by a machine processor, or an interpretable language that is understood and executed by an interpreter. A compiler front end typically parses the source code and generates a corresponding intermediate language (IL) representation. The intermediate language representation may be referred to simply as the intermediate language (IL). An IL may include an instruction set referred to as a bytecode. A code generator may receive the IL as input and generate the native code or other low level language code for execution.

One type of compiler is a static compiler that includes both a front end compiler and a code generator. The front end parses and translates the program into an intermediate language. The code generator translates the intermediate language to a native code, storing the native code in a file prior to execution of the program. In one technique, a debugging or analysis plug-in to the compiler may insert instructions in the IL, so that the inserted instructions are included in the native language. The inserted instructions may be used for debugging, analyzing, or optimizing the program. Inserting instructions may take multiple passes over the IL, or repeated computation of offsets in branch instructions, as the offsets of target instructions change due to insertion of new instructions. Because this is done prior to execution of the program being compiled, the extra time to do this is usually acceptable.

One technique for compilation and execution employs just-in-time (JIT) compilation. In this technique, the IL may be saved on a computer disk or dynamically generated in memory, and the IL for each function may be retrieved when it is invoked by the executing program. A code generator translates the function IL immediately prior to executing the function and saves the native code in memory, so that it is available the next time the function is invoked. It is desirable that the operations that are performed during execution of the program are fast, in order to enhance the operation of the program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to modify the execution of a computer program function. In various embodiments, modifications are performed to facilitate actions or services, such as logging, tracing of program execution flow, code coverage, memory analysis, performance analysis, debugging, documentation, or other types of program analysis. The system and methods facilitate modifications and analysis by providing mechanisms for efficiently identifying, locating, or modifying instructions of a designated type, instructions related to other instructions, or designated program constructs.

An example embodiment includes generating a directed graph that represents the function, such that the directed graph includes multiple instruction nodes, each instruction node representing a corresponding instruction of the function being compiled. In an example embodiment, one or more meta-nodes or meta-edges are inserted into the directed graph. One type of meta-edge is a back edge, which points from a target of a branch instruction to the branch instruction. The directed graph may be manipulated by using a back edge to locate a branch instruction, and adding or removing one or more instruction nodes. Following a manipulation of the directed graph, the graph may be translated into an intermediate language representation of the function. The intermediate language representation may be translated into a native code representation of the function, which is itself executable.

In an example embodiment, a meta-node having data of one or more exception blocks and corresponding exception handlers of the function is inserted into the directed graph. The meta-node may include an edge to the beginning of the exception block, an edge to the end of the exception block, an edge to the beginning of the exception handler, and an edge to the end of the exception handler. This meta-node may be used to locate an exception block or handler, or to add or remove instruction nodes to or from the directed graph.

In an example embodiment, a type meta-node corresponding to a specific type of instruction is inserted into the directed graph. A type meta-node may include an edge to instructions of the specific type within the function. A type meta-node may be used to locate corresponding instructions and add or remove instruction nodes or meta-edges related to these instructions in the directed graph.

In an example embodiment, a single scan of an intermediate language representation of the function is performed; during the single scan, the directed graph is generated, and back edges, meta-nodes, or meta-edges are inserted. Neither a second scan of the IL representation nor a scan of the directed graph is needed to insert these nodes, to locate instruction nodes of a specific type, or to locate exception blocks or handlers. For example, the meta-edges may be used to iterate through the target nodes of branch instructions, in order to modify back edges.

In an example embodiment, instructions to perform diagnostic actions of the function during execution of the program are inserted. Diagnostic actions may include one or more of capturing program variables, measuring performance, or measuring code coverage. In one embodiment, some of the mechanisms herein described are integrated with a just-in-time compiler, so that the directed graph, including meta-nodes and meta-edges, is created in response to invocation of the function, and the directed graph is translated to the IL, which may then be translated to native code and executed immediately after the processing of the directed graph is completed.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
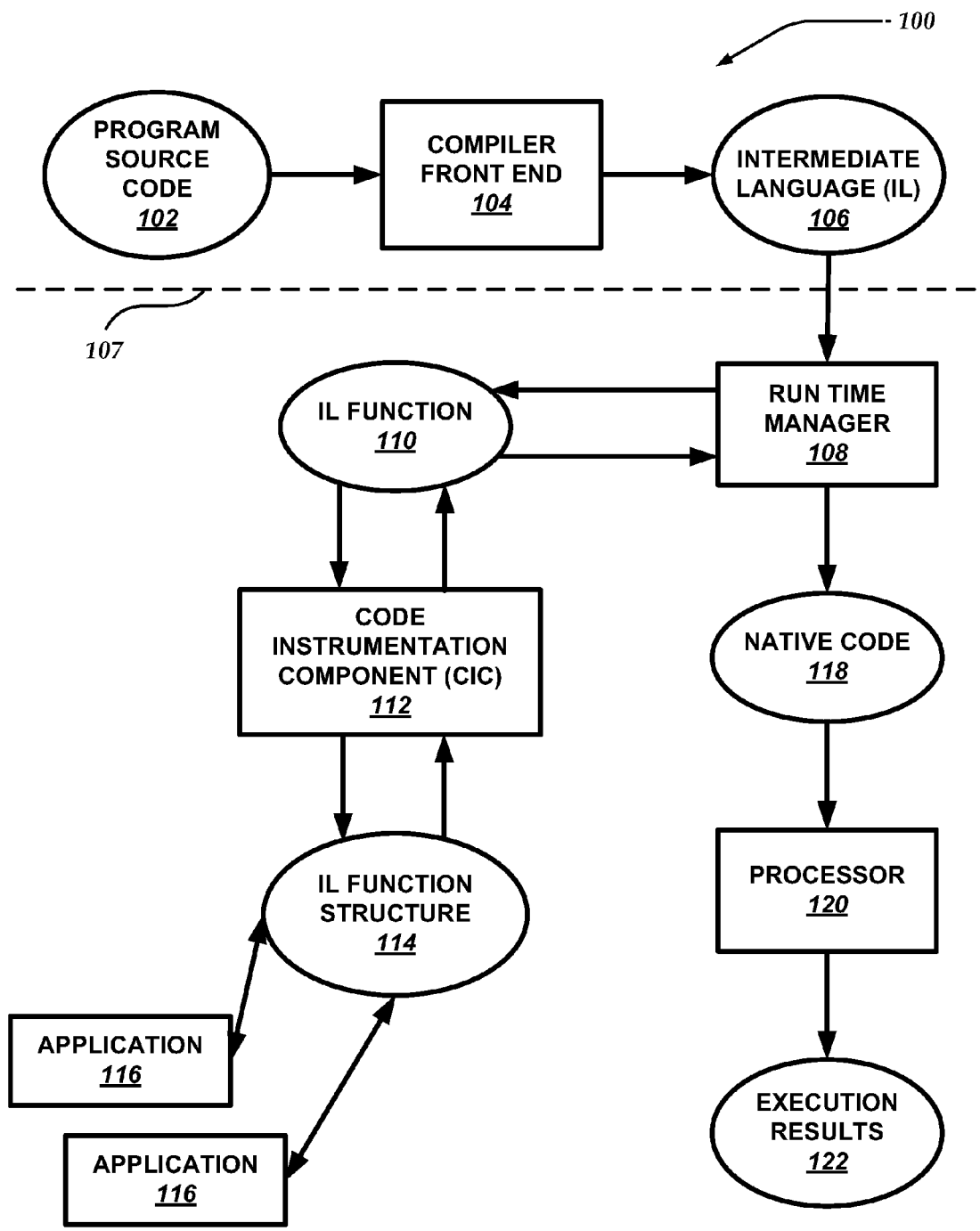
FIG. 1 is a block diagram of a computer system that may employ the mechanisms herein described.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "function" refers to a portion of code within a larger program that performs a specific task, and can execute relatively independently of other portions of the program. A function may, but does not necessarily, return a value. In various computer languages, different terms may be used, such as subroutine, method, procedure, or subprogram. As used herein, the term "function" may include all of these.

As used herein, the term "branch instruction" refers to a computer instruction that directs a computer to continue execution flow at a "target instruction." A branch instruction may be a conditional branch instruction or an absolute branch instruction.

As used herein, the term "edge" refers to a reference to a physical or logical memory location or data structure. An edge may be implemented in a variety of ways. It may be used to identify or locate a node of a graph structure.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

FIG. 1 is a block diagram of a computer system 100 in which mechanisms described herein may be implemented. FIG. 1 is only an example of a suitable system configuration and is not intended to suggest any limitation as to the scope of use or functionality of the present invention. Thus, a variety of system configurations may be employed without departing from the scope or spirit of the present invention.

As illustrated, the components of FIG. 1 include oval-shaped components that represent a computer program, or portions thereof, that is processed by one or more mechanisms described herein. Rectangular components represent computer software, hardware, or combinations thereof, that performs the actions of the mechanisms described herein. As illustrated, system 100 includes program source code 102, which may be a high level language representation of a computer program. Examples of a high level language include C-Sharp (C#), Visual Basic, C++, Java, or various other high level languages. A language that is compiled into an IL before being compiled into native code is typically referred to as a "managed language." A program may include one or more functions. A program may reside in one or more files or other storage representations. A program may include one or more libraries, which may be integrated or distributed in a variety of ways. Thus, program source code 102 may represent a program library or a portion thereof.

As illustrated, system 100 includes compiler front end 104. In one implementation, compiler front end includes a lexical analyzer, a syntax analyzer, and a semantic analyzer, though various other components or configurations may be employed. In one embodiment, compiler front end 104 processes program source code 102, translating it into an intermediate language module 106. In one implementation, intermediate language module 106 may represent the entire program source code 102 and include multiple functions, though it may include only a portion of the program source code 102 or a portion of a function. In one implementation, intermediate language module 106 is stored as one or more files. In one implementation, intermediate language module 106 includes a binary sequence of instructions, or a binary stream, that corresponds to program source code 102.

Dashed line 107 represents a distinction between actions that are considered static and dynamic. That is, actions above the line 107 are static, e.g., may occur prior to execution of the computer program represented by program source code 102 and intermediate language module 106. Actions below the line 107 are dynamic, e.g., may occur during execution of the computer program, or in response to invocation of the program or portions thereof.

As illustrated, run-time manager 108 is a system component that manages execution of the computer program. In various configurations, run-time manager 108 may perform one or more of a number of actions, including loading program functions that are invoked by the execution of the computer program, translation of the program functions, locating and loading libraries or other resources employed by the program, or invocation or managing various program resources. Run-time manager 108 may be referred to as implementing a system framework that provides various resources and services to the executing computer program.

In one configuration, run-time manager 108 includes a just-in-time (JIT) compiler or a portion thereof. Generally, a JIT compiler employs a mechanism in which an intermediate language representation of a program function is loaded and translated into a native language representation in response to its first invocation. For example, when a running program calls or invokes a function for the first time, in response to detecting the call the intermediate language representation of the function can be quickly compiled into native code and then run. The native language representation may be stored in memory so that the translation is not needed for subsequent invocations. One example of a run-time manager 108 is the Common Language Runtime (CLR) component, by Microsoft Corporation, of Redmond, Wash. The CLR employs an intermediate language representation known as the Common Intermediate Language (CIL). In one configuration, a JIT compiler of the run-time manager may translate the IL to native code immediately prior to execution, in response to detecting an invocation of the program or function. In one embodiment, a system may employ multiple processes, such that a JIT compiler may include a process that loads or translates a function concurrently with execution of execution of another function. The system may detect an invocation of a function prior to the execution of the invocation, so that at least a portion of the loading or translation is performed prior to the execution of the invocation. The term "detection" includes detection of an invocation, during run-time, prior to execution of the invocation. In one configuration, the run-time manager may translate the IL to native code prior to runtime.

As illustrated in FIG. 1, IL function 110 is an intermediate language representation of a function that may be loaded by run-time manager 108 from intermediate language module 106 during runtime and translated or compiled into native code 118. In one implementation or embodiment, IL function 110 is represented as a binary sequence of instructions, or a binary stream. IL function 110 may be a portion of the intermediate language module 106.

In one implementation, IL function 110 may be loaded by run-time manager 108 and translated into native code 118 prior to run-time. Run-time as used herein refers to the run-time of the program within which the function resides. The native code 118 may be stored to computer storage for subsequent use during execution of the computer program.

As illustrated in FIG. 1, code instrumentation component (CIC) 112 may receive IL function 110 and generate an IL function graph 114 from it. The IL function graph provides a mechanism for modifying the IL function or performing one or more of a number of processes, as described in further detail herein. CIC 112 may then translate a modified IL function graph back into the intermediate language, resulting in a modified version of IL function 110. When run-time manager 108 subsequently translates IL function 110 to native code 118, the native code includes the modifications. Modifications may include adding, deleting, moving, or modifying program instructions, as described in further detail herein.

System 100 may include one or more applications 116 that process IL function graph 114. This processing may include any of the modifications of the IL function described herein, thereby enabling the modifications to be represented in the resulting native code 118 prior to execution of the function. The processing may include an analysis of the IL function. In some implementations, applications 116 may have corresponding components that are employed by run-time manager 108 during or after execution of the program function to perform services of the application. For example, an application 116 may insert program instructions to count the number of times each function is invoked. In one embodiment, the data obtained by counting may then be processed by the application or a related application during run-time of the program or after the program ends. In one embodiment, the data may be stored for subsequent use by an application. Data obtained by inserted instructions may be used in a variety of ways, such as showing program traces, code coverage, hot spots or heavily executed program segments. Examples of applications 116 are discussed in further detail herein.

As illustrated, system 100 may include processor 120, which performs actions to execute native code 118. In one configuration, processor 120 may include one or more central processing units, a processor core, an ASIC, or other hardware processing component and related program logic. In one configuration, process 120 may include a software component simulating a hardware processing unit. Processor 120 executes instructions in the native code 118.

Execution results 122 is a logical representation of the results of executing the native code 118. The results may include one or more of modifications to computer storage or computer memory, communication with other processes or computing devices, audio or video output, or control of various system or external components. Execution results 122 may include results that are the result of modifications to the IL function performed by CIC 112 or applications 116 as discussed herein. For example, execution results 122 may include a report of the number of times various program functions or program instructions are invoked, the flow of the executing program, timing of various actions, factors relating to memory allocation, or other analytics corresponding to the program function.

System 100 may be a subsystem of a development system. A development device may include one or more computing devices that are used by a program developer or a user as part of a program development, testing, or documentation process. The components of system 100 may be distributed among one or more computing devices, each of which may communicate with the others by employing one or more of various wired or wireless communication protocols such as IP, TCP/IP, UDP, HTTP, SSL, TLS, FTP, SMTP, WAP, Bluetooth, WLAN, or the like.

A computing device may be a special purpose or general purpose computing device. In brief, one embodiment of a computing device that may be employed includes one or more processing units, a memory, a display, keyboard and pointing device, and a communications interface. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device of a development system.

As illustrated and discussed, system 100 enables CIC 112 or applications 116 to perform various actions or services with respect to a computer program or functions thereof. As discussed herein, these actions or services may include logging, tracing of program execution flow, code coverage, memory analysis, performance analysis, debugging, documentation, or other types of program analysis or diagnostic actions. In some embodiments, this includes modifications to a program's behavior, such as fault injection.

Figure 2A:
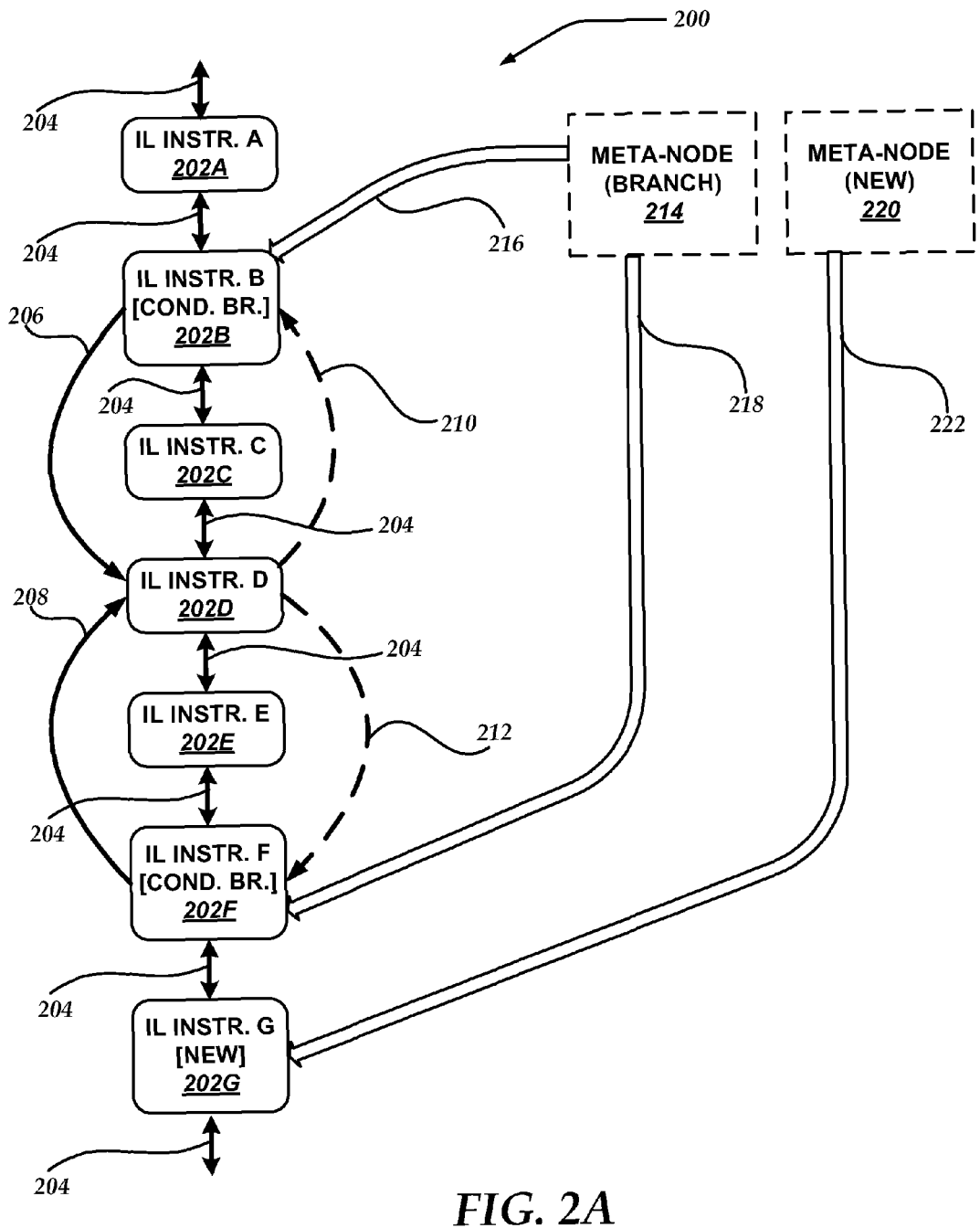
FIGS. 2A-B are block diagrams of data structures that may be generated and employed by one or more of the mechanisms herein described.

FIG. 2A illustrates a data structure 200 that may be generated and employed, in accordance with the mechanisms herein described. There are many data structures that may be employed, and data structure 200 is included to illustrate some aspects of the mechanisms described. Data structure 200 may be a portion of a greater and more complex data structure.

As illustrated, data structure 200 includes multiple nodes A-G 202*a-g*, each labeled as corresponding IL instruction A-G. Each node A-G 202*a-g* corresponds to one intermediate language instruction and may correspond to a single IL instruction received from an instruction stream, such as IL function 110 of FIG. 1. Nodes A-G 202*a-g* may be referred to herein as "instruction nodes." Data structure 200 may be a portion of IL function graph 114.

Nodes A-G 200*a-g* are connected by edges 204, 206, 208, which together form a directed graph. The edges 204 represent a flow of program execution without branching, such that each node points to a subsequent node representing a sequence of program instructions when a branch is not taken. As illustrated, in one embodiment, each of the edges 204 may be a pair of graph edges, such that a sequence of nodes A-G 200*a-g* and edges 204 form a doubly linked list. Edge 206 represents logic associated with a branch instruction, in which node B 202*b* corresponds to the source of the branch, the branch instruction itself, and node D 202*d* corresponds to the target of the branch. In particular, the instruction of node B represents a conditional branch instruction, in which program flow proceeds to either the instruction of node C 202*c* or node D 202*d*, based on the specified condition.

Similarly, edge 208 represents a logic associated with a branch instruction, in which node F 202*f* corresponds to the source of the branch, and node D 202*d* corresponds to the target of the branch. The instruction of node F is therefore a conditional branch instruction, though the specified condition may differ from that of node B 202*b*. Thus, node D 202*d* is a target of two different branch instructions. The edge 208, together with the edges 204 that connect nodes D-F 202*d-f*, serve to create a cycle within the directed graph; therefore, this particular example is of a directed cyclic graph, though some directed graphs may be acyclic.

In one aspect of the mechanisms described, a meta-edge may be created to indicate, for each branch, the source branch instruction, such that the source branch instruction can be determined from the target branch node. These meta-edges may be referred to herein as "back edges." A back edge points from the target of a branch node back to the source branch node. Thus, as illustrated, node D 202*d* has two meta-edges 210 and 212 that are back edges. Meta-edge 210 points to node B 202B and meta-edge 212 points to node F 202*f*.

In one aspect of the mechanisms described, one or more meta-nodes may be created to indicate, for each type of instruction, the location of the corresponding instructions. These meta-nodes are referred to as instruction type meta-nodes. As illustrated, branch meta-node 214 is an instruction type meta-node that represents branch instructions. Meta-edges 216 and 218 point from branch meta-node 214 to node B 202*b* and node F 202*f*, respectively. Thus, the branch instructions of the function can be determined from the branch meta-node 214 corresponding to branch instructions. Similarly, instruction type meta-node 220 represents "new" instructions, which may be used to allocate a new object. Edge 222 points from instruction type meta-node 220 to node G 202*g*. Thus, the "new" instructions of the function can be determined from the meta-node 220 corresponding to "new" instructions.

Figure 2B:
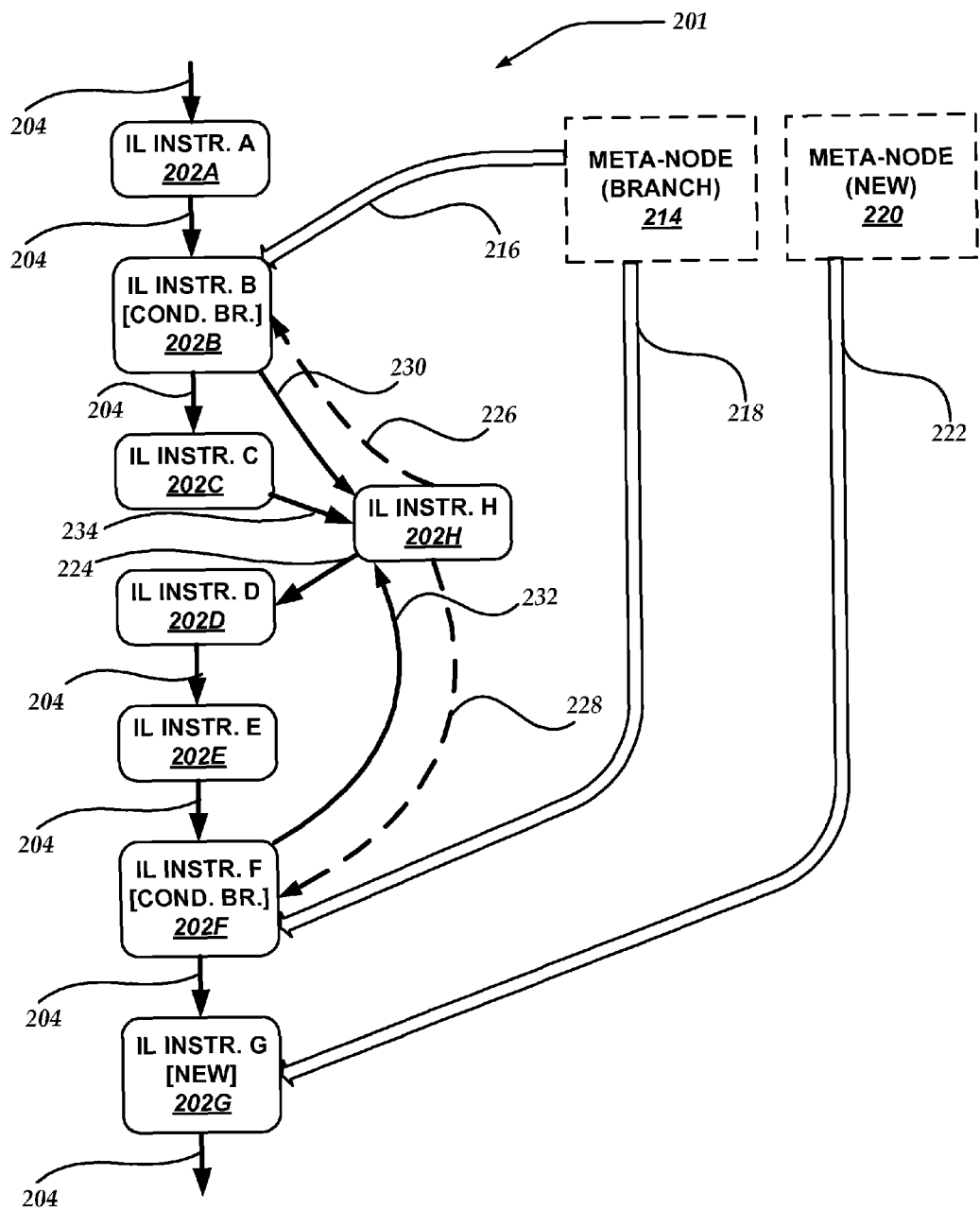

Though FIGS. 2A, 2B illustrate instruction type meta-nodes that point to branch instructions and "new" instructions, other instruction type meta-nodes corresponding to other types of instructions may be generated and used in a similar manner to point to other types of instructions. Function call instructions and throw instructions are additional examples of such types of instructions, though instruction type meta-nodes may correspond to virtually any type of instruction. Instruction type meta-nodes may be created to correspond to all instruction types of the function, or a portion thereof. Type meta-nodes may be defined in a variety of ways, and may allow for a particular node to be pointed to by multiple type meta-nodes. In one implementation, type meta-nodes may be defined based on the structure or semantics of the function. For example, a type meta-node may be defined that points to targets of branch instructions.

In one implementation, the processes of the mechanisms may scan the IL function 110 (FIG. 1) and create an initial directed graph with one node corresponding to each IL instruction of the function. During this pass, the instruction type meta-nodes corresponding to each type of instruction may be created, and the meta-edges from each instruction type meta-node may be generated. The process may then employ the instruction type meta-node for branch instructions to locate each branch instruction, locate each corresponding branch target node, and create a back edge from each branch target node to each branch source node. It is therefore not necessary to perform a second scan of the IL function 110 or to scan the graph structure to locate branch instructions.

In one embodiment, the directed graph does not require offsets of instructions to be stored when creating or manipulating the directed graph. Edges to nodes may substitute for offsets. For example, a branch instruction may have an edge to the target instruction, rather than an offset of the target instruction. Each time an instruction node is inserted into or deleted from the function, it is not necessary to update offsets in instructions that reference other instructions. When the directed graph is translated back into the IL, the offset of each referenced instruction may be stored at the corresponding node, and offsets may be filled in referencing instructions by using edges to the referenced instruction. This avoids having to update an offset reference each time instructions are inserted or deleted, thus minimizing the amount of time required to modify the function. This is particularly important in a JIT compiler that performs modifications immediately prior to execution of the function.

For example, a branch instruction is one type of referencing instruction in that in the IL, it includes an offset of the target instruction. The target instruction is the corresponding referenced instruction. While translating the directed graph into the IL stream, during a first pass, when a branch instruction or a target instruction is translated, the corresponding offset in the IL stream may be stored in the directed graph node. The offset within each branch instruction in the IL stream may be left blank. Subsequently, the system may find each branch instruction by examining a branch instruction type meta-node, which points to the branch instruction node, the branch instruction node containing the branch instruction offset in the IL. The edge to the target instruction, found at the branch instruction node, provides the target instruction node, which contains the offset of the corresponding instruction in the IL. The blank offset in the branch instruction of the IL may then be filled in with the corresponding target instruction offset. Thus, the system employs the branch type meta-node to insert an offset of the target instruction into the branch instruction that references it. The system does not need to perform a scan of the IL stream, or a second traversal of the directed graph, when translating the directed graph back to the IL. In one embodiment, during a first stage of IL generation, the directed graph is traversed and instruction offsets are determined. During a second stage of IL generation, the meta-nodes for branch instructions and similar instructions are traversed and used to fill in the offsets. The IL may then be output.

FIG. 2B illustrates a data structure 201 that is a modification of data structure 200 of FIG. 2A. Data structure 201 may be created as a result of applying some of the mechanisms herein described to data structure 200. Components of FIG. 2B are similar to like numbered components of FIG. 2A, and the discussion of the latter is applicable to the former, except where described otherwise.

Data structure 201 illustrates a state subsequent to an insertion of an instruction node prior to node D 202*d*. As discussed above, in data structure 200, node D 202*d* is a target node of node B 202*b* and node F 202*f*. The modification of data structure 201 creates a new node H 202*h*, and makes this node a target node of node B 202*b* and node F 202*f*, to be executed prior to existing node D 202*d*. As illustrated, new edges 230 and 232 are added and replace deleted edges 206 and 208, respectively. Similarly, new meta-edges 226 and 228 are added and replace deleted meta-edges 210 and 212, respectively. New edges 234 and 224 replace the edge 204 that previously connected node C 202*c* with node D 202*d*.

In one implementation, the modifications illustrated by FIG. 2B may be made without requiring a scan of the data structure 200 to locate the branch instructions that have node D 202*d* as their target. This may be done by using the meta-edges 210 and 232 of node D 202*d* that serve as back edges to identify and locate the nodes representing branch instructions. Meta-nodes, such as branch meta-node 214 may be used to identify branch instructions or target instructions, without requiring a scan of the data structure 200.

FIG. 2B and the associated discussion illustrate an example modification that may be performed by an application. The processing by each application may leave the IL function graph in a consistent format such that additional processing by a subsequent application may be performed without changing the format. Additionally, an application may indicate an identification of any nodes that it creates, enabling another application to either incorporate or ignore the nodes. An inserted instruction node may be identified as such, and other applications may distinguish newly inserted instruction nodes from previously existing program instruction nodes. For example, a first application may insert an instruction that calls a function used by the application, such as a logging function. By identifying this function call as a newly inserted instruction node, a second application that inserts tracing instructions prior to each function call may elect to not consider the first application's call instruction in the same way that it does the other call instructions of the program. This allows an application performing an analysis to avoid analyzing instructions inserted by another application.

Figure 3:
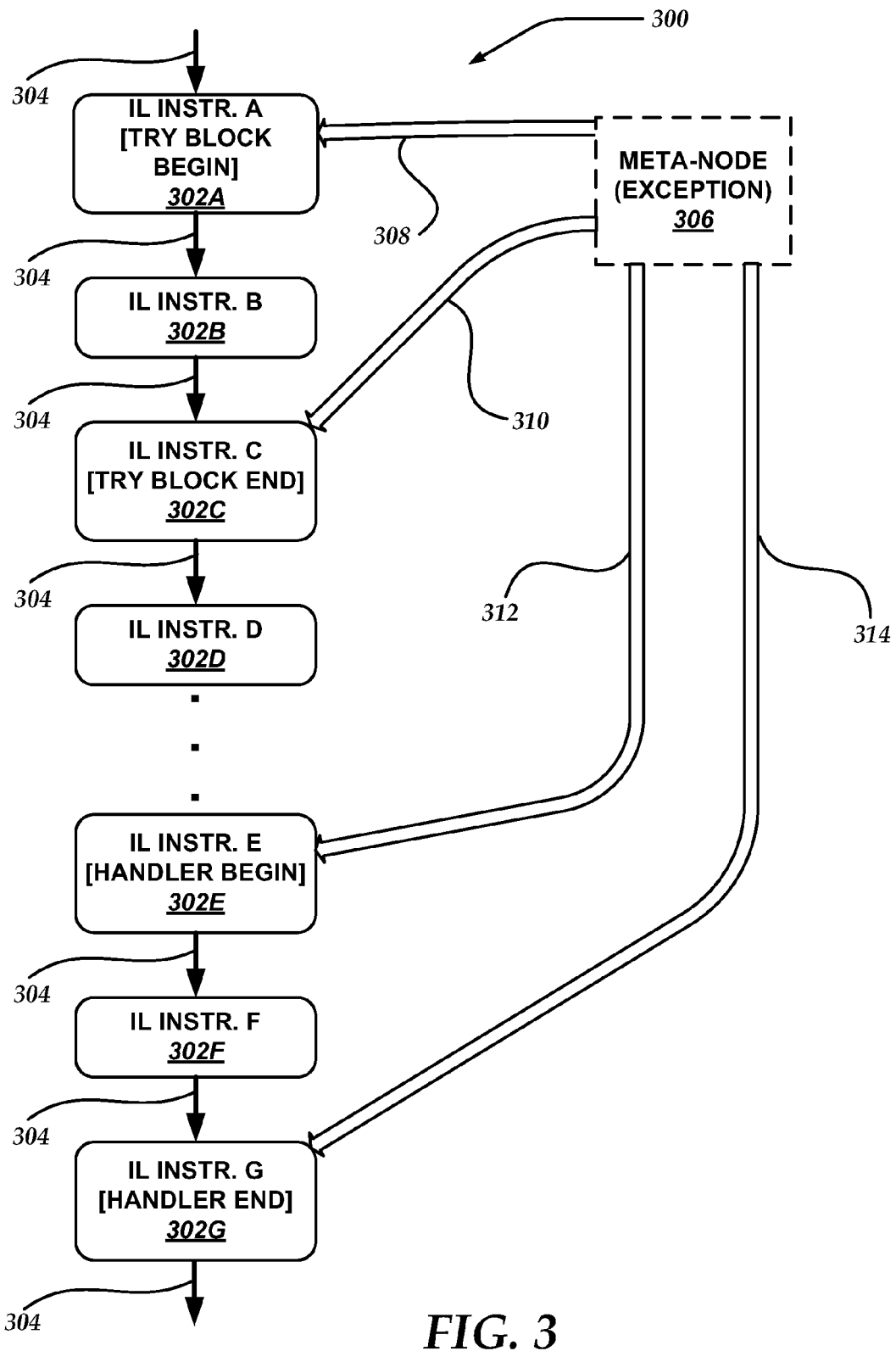
FIG. 3 is a block diagram of a data structure that may be generated and employed by one or more of the mechanisms herein described.

FIG. 3 illustrates a data structure 300 that may be generated and employed, in accordance with the mechanisms herein described. Data structure 300 may be a portion of a greater and more complex data structure.

As illustrated, data structure 300 includes multiple nodes A-G 302*a-g*, each labeled as corresponding IL instruction A-G. Many of the features of data structure 200 (FIG. 2A) are applicable to data structure 300. For example, each node A-G 202*a-g* corresponds to one intermediate language instruction and, together with edges 304, forms a directed graph. Edges 304 represent a flow of program execution.

The instructions of data structure 300 include an exception block and an exception handler specification. In particular, node A 302*a* represents a beginning of an exception "try" block; node C 302*c* represents the end of the exception "try" block; node E 302*e* represents the beginning of a corresponding exception handler; and node G 202*g* represents the end of the exception handler. The exception block and handler may be specified in accordance with the semantics of any of a number of high level languages.

As illustrated in FIG. 3, data structure 300 includes an exception meta-node 306, which is an instruction type meta-node that represents exceptions. In one implementation, exception meta-node 306 may include, for each specified exception, an identification of the exception block beginning, the exception block ending, the handler beginning, and the handler ending. These identifications may include meta-edges 308, 310, 312, and 314 that function as edges to the respective nodes 302*a*, 302*c*, 302*e*, and 302*g* that correspond to these locations. In one implementation, exception meta-node 306 maintains this data for each exception of a function or code sequence. In one implementation, exception meta-node 306 may reference one or more other meta-nodes that each identifies a corresponding exception.

Exception meta-node 306 and associated meta-edges 308-314 may be used by various applications to identify exception blocks and handlers, insert or modify code associated with exceptions, or for other uses. For example, an application may insert one or more instructions in an exception block to simulate an exception. Instructions may be inserted in a handler to track exceptions.

The use of meta-nodes such as exception meta-node 306 and branch meta-node 214 facilitate minimal calculation of instruction offsets when inserting nodes or otherwise modifying the instruction sequence. For example, by maintaining edges to the nodes representing the beginning of an exception block and the end of the exception block, one or more instruction nodes may be inserted into the block without recalculating an offset of the block end. The method used for this is similar to that discussed with respect to FIG. 2A. Briefly, graph edges substitute for offsets. Offsets are inserted into the corresponding exception instruction when translating a directed graph back to an IL stream. Thus, the system employs the exception type meta-node to insert an offset of an instruction into the instruction that references it. An application or multiple applications may thus make multiple modifications within the block without performing repeated calculations of the offsets. Calculation of an offset may be made once, when the modified directed graph is translated into the IL representation. This facilitates fast performance when processing a function, which is particularly beneficial when the processes are used as part of a JIT compiler that performs modifications immediately prior to execution of the function.

Figure 4:
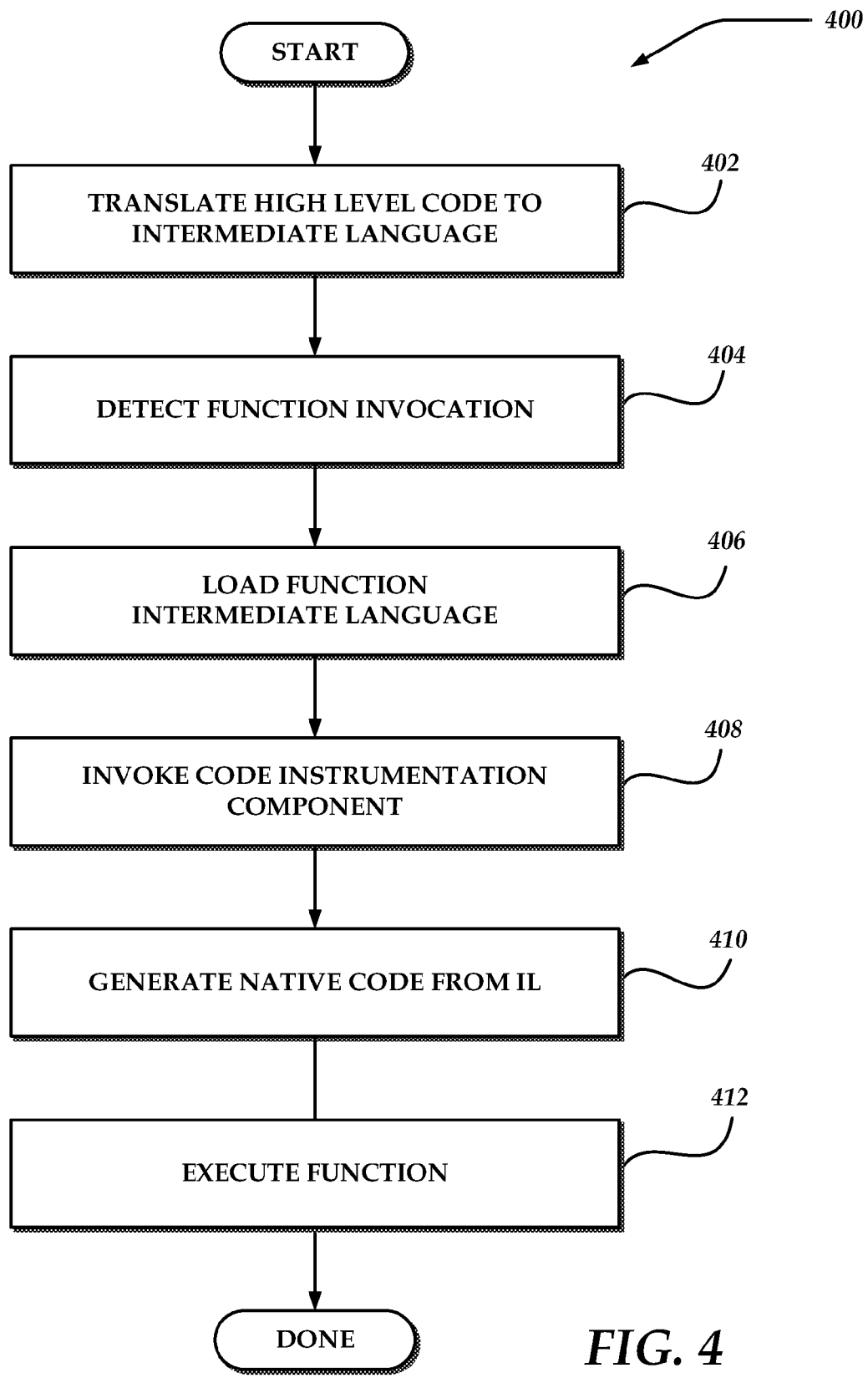
FIG. 4 is a flow diagram illustrating a process for employing a data structure representing a program function, in accordance with an example embodiment.

FIG. 4 is a flow diagram illustrating a process 400 for generating and employing a data structure representing a program segment, in accordance with an embodiment of the invention. Process 400 may be employed by a development device, such as a development device incorporating system 100 of FIG. 1, or a variation thereof.

As shown in FIG. 4, after a start block, at block 402, high level program code is translated into an intermediate language representation. The program code may correspond to a complete computer program, one or more functions, a library, or a portion thereof. The high level program code may be coded in one or more high level languages, such as C#, Visual Basic, or other languages. The actions of block 402 may occur prior to execution of the corresponding program. In one implementation, the intermediate language representation may be stored in volatile or non-volatile computer memory or computer storage in one or more blocks, files, or other data objects. Intermediate language module 106, of FIG. 1, illustrates an intermediate language representation in one embodiment.

Process 400 may flow from block 402 to block 404, where a function invocation is detected. Detecting a function invocation includes, during execution of a computer program, receiving an event, signal, or other information indicating that the function is being invoked or is about to be invoked. The function may be a function that is included in the intermediate language representation produced at block 402. Thus, the actions of block 404 may occur subsequent to a beginning execution of the program represented by the intermediate language representation.

Process 400 may flow from block 404 to block 406, where the intermediate language representation corresponding to the invoked function may be loaded into computer memory. In one implementation, the intermediate language representation is in a format of a binary sequence of instructions. In one implementation, the function is loaded into a single block of memory. In another implementation it is loaded into multiple blocks.

The process may flow from block 406 to block 408, where a code instrumentation component, such as CIC 112 of FIG. 1, is invoked. The actions of block 408 are described in FIG. 5. Briefly, these actions may include generating an IL function graph from the intermediate language representation, the IL function graph including a directed graph; adding or deleting instructions from the IL function graph; enabling one or more applications to perform operations on the IL function graph; and converting the IL function graph back to a representation with the format of the intermediate language representation as loaded at block 406.

The process may flow from block 408 to block 410, where the IL representation is translated to generate a native code representation of the program segment. The process may flow to block 412, where the function represented by the native code may be executed by a processor. As discussed herein, the processor, such as processor 120 of FIG. 1, may include a hardware processing component, a software component, or a combination thereof.

Execution of the function may result in process 400 flowing back to block 404, where another function is invoked. Though not illustrated in FIG. 4, some iterations of process 400 may include a subset of the illustrated actions. For example, a subsequent execution of a function for which native code has been generated may be performed directly with the generated code saved from a prior invocation.

Upon a program termination or other condition, the process may flow to a done block and return to a calling program.

Figure 5:
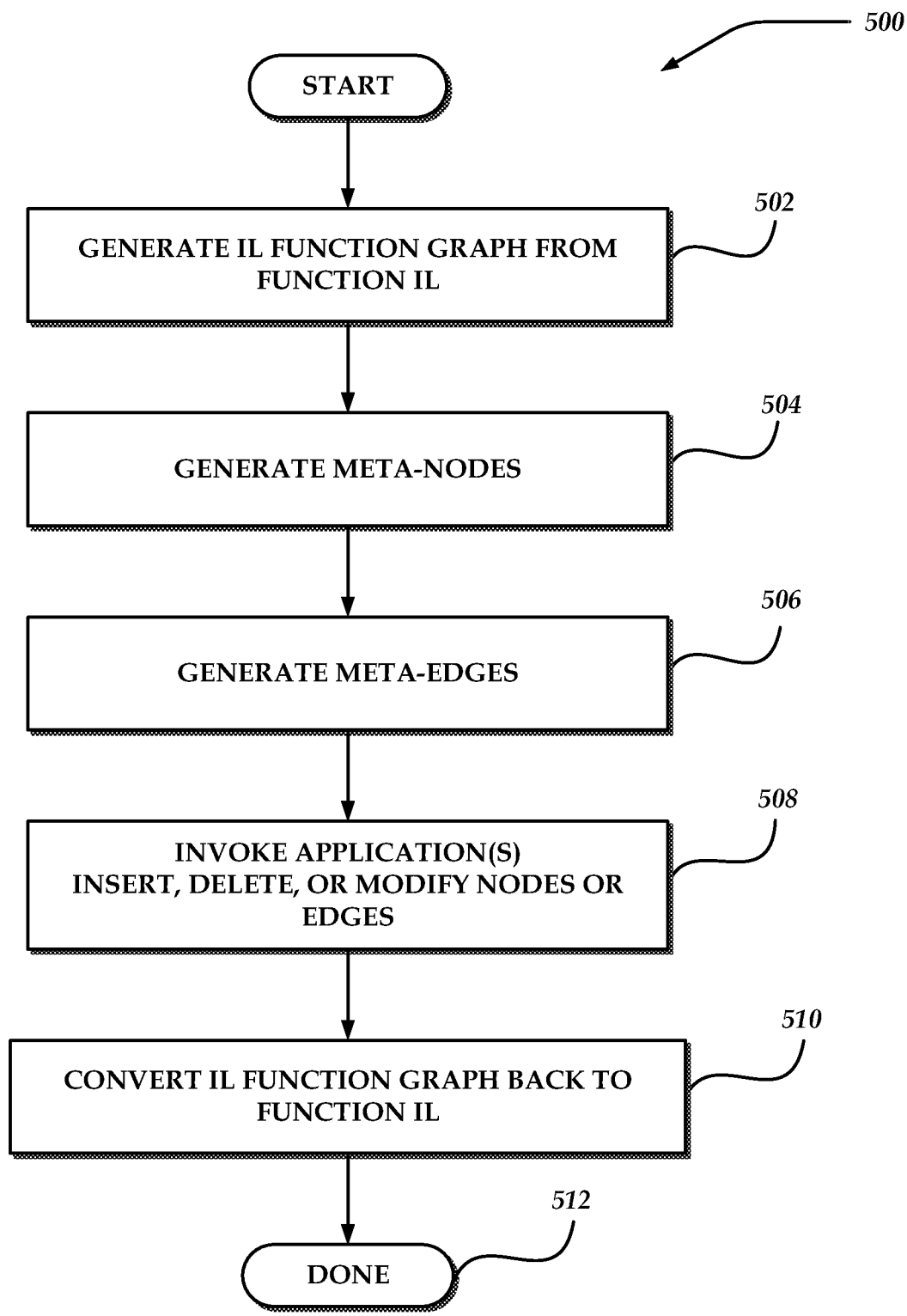
FIG. 5 is a flow diagram illustrating another process for generating and employing a data structure representing a program function, in accordance with an embodiment.

FIG. 5 illustrates a process 500 for generating and modifying a data structure representing a program segment. In one implementation, the program segment may be a program function represented in an intermediate language. In one implementation, process 500, or a portion thereof, may be performed as part of the actions of block 408 of FIG. 4. Process 500, or a portion thereof, may be performed by a code instrumentation component such as CIC 112 of FIG. 1, or in conjunction with related components such as applications 116.

As illustrated, at block 502, an IL function graph is generated from the function IL representation. In one embodiment, the IL function graph is a directed graph structure in which there is at least an approximate one-to-one correspondence between IL instructions and nodes of the function structure, such as illustrated by the instruction nodes A-G 202a-g and edges 204, 206, and 208 of FIG. 2A. In some implementations, additional nodes may be included, or some instructions may be combined to correspond to one node, such that there is not a one-to-one correspondence. However, structures having a one-to-one correspondence between instruction nodes and IL instructions are described herein for illustrative purposes.

The process may flow from block 502 to block 504, where one or more meta-nodes may be generated and incorporated into the IL function graph. Meta-nodes 214 and 220 of FIG. 2A, and exception meta-node 306 of FIG. 3 are examples of such meta-nodes. As discussed herein, meta-nodes may correspond to instruction types, and serve to identify instructions of a particular type or other identification of instructions. As also discussed, meta-nodes may correspond to exception blocks and handlers, and serve to identify the boundaries of each exception block and its corresponding handler. Generation of meta-nodes is typically accompanied by generation of associated meta-edges, as shown in block 506.

Process 500 may flow from block 504 to block 506, where one or more meta-edges may be generated and incorporated into the IL function graph. FIG. 2A illustrates two examples of such meta-edges 210 and 212, which serve as back edges corresponding to the edges 206 and 208, respectively. In one implementation, back edge meta-edges are generated corresponding to each branch instruction of the IL function graph.

Though blocks 502, 504, and 506 are illustrated as separate blocks in a sequence, various implementations of process 500 may differ. For example, in one implementation, generation of the IL function graph includes performing a scan of the IL function 110 and, during the scan, inserting nodes into a directed graph while generating meta-nodes and meta-edges for each instruction type. Thus, during a single scan, nodes, instruction type meta-nodes, and corresponding meta-edges may be created. It is therefore not necessary to perform a second scan of the IL function or to traverse the directed graph. Additional meta-edges, such as meta-edges 210 and 212 may be added without requiring a second scan of the IL function or a scan of the directed graph.

Process 500 may flow from block 506 to block 508, where one or more applications may be invoked. Each application may process the IL function graph by analyzing the content or organization, inserting, deleting, or modifying nodes or edges, or other types of processing. This may include inserting one or more instruction nodes, such that the corresponding instruction is executed during a subsequent execution of the function. One example of this is an instruction that causes a fault, such as an exception, to occur. This may be used to perform "fault injection," where a fault is caused to analyze how the program performs in response to the fault. Other instructions may be inserted to facilitate or perform logging, tracing of program execution flow, code coverage, memory analysis, performance analysis, debugging, documentation, or other types of program analysis. Code coverage is a type of program analysis that determines which instructions of a program are executed during one or more executions of a program or portion thereof. Memory analysis is a type of program analysis that determines metrics related to allocation and use of memory, such as amount of memory used, proper allocation and deallocation of memory, failure to free allocated memory, or the like.

The process may flow from block 508 to block 510, where the IL function graph 114 may be translated back to the IL function 110. Modifications to the IL function graph 114, such as newly inserted instructions, may be reflected in the IL function. In one embodiment, the translation back to the IL function 110 may include traversing the instruction nodes of the IL function graph 114, while not processing instruction type meta-nodes, exception meta-nodes, or other meta-nodes that are not instruction nodes. The process may flow from block 508 to a done block 512 and return to a calling program, such as to block 410 of process 400, where the modified IL function 110 may be translated to native code and subsequently executed.

It will be understood that each block of the flowchart illustrations of FIGS. 4 and 5 and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-implemented method for modifying execution of a computer program function having a plurality of instructions, comprising:
   a) in response to detecting an invocation of the computer program function, generating a directed graph representing the computer program function, the directed graph including a plurality of instruction nodes, each instruction node representing a corresponding instruction of the plurality of instructions;
   b) inserting, into the directed graph, one or more meta-nodes, the one or more meta-nodes including a first edge to an instruction node of the directed graph corresponding to an instruction of an exception block and a second edge to an instruction node of the directed graph corresponding to a handler associated with the exception block; and
   c) employing the one or more meta-nodes to perform at least one of adding or removing at least one other instruction node to the directed graph; and
   d) translating the directed graph to an intermediate language representation of the computer program function.

2. The method of claim 1, further comprising translating the intermediate language representation of the computer program function into a native code representation of the computer program function.

3. The method of claim 2, further comprising translating the intermediate language representation to a native code representation and executing the native code representation.

4. The method of claim 1, further comprising:
   a) inserting, into the directed graph, one or more back edges that point from an instruction node representing a target of a branch instruction to an instruction node representing the branch instruction;
   b) manipulating the directed graph by employing the one or more back edges to perform at least one of adding or removing at least one additional instruction node to the directed graph.

5. A computer-implemented method for modifying execution of a computer program function having a plurality of instructions, comprising:
   a) in response to detecting an invocation of the computer program function, generating a directed graph representing the computer program function, the directed graph including a plurality of instruction nodes, each instruction node representing a corresponding instruction of the plurality of instructions;
   b) inserting, into the directed graph, a type meta-node corresponding to a type of instruction, the type meta-node pointing to a plurality of associated instruction nodes of the directed graph, each associated instruction node representing a corresponding instruction of the type corresponding to the type meta-node;
   c) employing the type meta-node to perform at least one of adding or removing at least one other instruction node to the directed graph; and
   d) translating the directed graph to an intermediate language representation of the computer program function;
   wherein the type corresponding to the type meta-node is at least one of a branch instruction, an exception block beginning, an exception block ending, an exception handler beginning, or an object allocation instruction.

6. The method of claim 5, further comprising scanning an intermediate language representation of the computer program function in one pass, and generating the directed graph, inserting the one or more back edges, and inserting the one or more meta-nodes during the scan of the intermediate language.

7. The method of claim 5, wherein the type of instruction is a branch instruction or a function invocation instruction, and the at least one other instruction node represents at least one instruction for determining a flow of the computer program during a subsequent execution.

8. The method of claim 5, translating the directed graph to the intermediate language representation comprising employing the type meta-node to insert an offset of a first instruction into a second instruction that references the first instruction.

9. A hardware computer-readable storage device comprising computer program instructions for enabling execution of a computer program function having a plurality of instructions including at least one branch instruction and at least one exception handler, the program instructions executable by a processor to perform actions including:
- a) in response to detecting an invocation of the computer program function, generating a data structure representing the computer program function, the data structure including at least one directed graph, each of the plurality of instructions represented by a corresponding instruction node of the at least one directed graph;
- b) inserting, into the at least one directed graph, a back edge corresponding to each target of each branch instruction, the back edge indicating an instruction node representing the branch instruction corresponding to the target;
- c) employing the back edge to insert at least one instruction node into the at least one directed graph;
- d) inserting, into the at least one directed graph, at least one instruction type meta-node, each instruction type meta-node having one or more edges to a corresponding one or more instruction nodes of the at least one directed graph, the one or more instruction nodes representative of a type of instruction corresponding to the instruction type meta-node;
- e) employing the one or more edges of the at least one instruction type meta-node to insert at least one other instruction node into the at least one directed graph; and
- f) translating the data structure to an intermediate language representation of the computer program function.

10. The hardware computer-readable device of claim 9, the actions further including:
- a) generating an exception block meta-node including an exception block edge that points to a node of an exception block and an exception handler edge that points to a node of an exception handler; and
- b) employing the exception block meta-node to insert an instruction node into the directed graph.

11. The hardware computer-readable storage device of claim 9, the at least one other instruction node representing at least one instruction for performing an analysis of the program function, the analysis including at least one of fault injection or memory analysis.

12. The hardware computer-readable storage device of claim 9, the actions further including translating the intermediate language representation to a native code representation of the computer program function and enabling execution of the computer program function.

13. The hardware computer-readable storage device of claim 9, the action further including generating the at least one directed graph, inserting the back edge, and inserting the instruction type meta-node by performing a single scan of a representation of the computer program function.

14. A computer-based system for translating and executing a computer program, comprising:
- a) a run-time manager that in response to an invocation of a computer program function, generating a directed graph representing the computer program function, the directed graph including at least one instruction type meta-node pointing to at least one node representing an instruction of a designated type and further including an exception meta-node with a first edge to an exception block and a second edge to an exception handler corresponding to the exception block;
- b) an application that modifies the directed graph to insert one or more nodes representative of one or more program instructions for performing analysis of the computer program function; and
- c) a code generator that translates the directed graph to an executable representation of the computer program function; and
- d) a hardware processor that executes an executable representation of the computer program function;
- wherein the runtime manager manages execution of the executable representation of the computer program function.

15. The system of claim 14, wherein the run-time manager generates the directed graph and inserts an instruction node that is a target of each of two other instruction nodes by performing a single scan of an intermediate language representation of the computer program function.

16. The system of claim 14, the exception meta-node having a third edge to an end of the exception handler.

17. The system of claim 14, the directed graph further including at least one back edge pointing from a target instruction node to a corresponding instruction node representing a branch instruction directed to the target instruction node.

18. The system of claim 14, the directed graph further including at least two back edges, each back edge pointing from a first target instruction node to a corresponding instruction node representing a branch instruction, the application including program instructions to perform actions including inserting a second target instruction node prior to the first target instruction node, employing the at least two back edges to modify the instruction nodes representing the branch instructions to point to the second target instruction node.

19. The system of claim 14, the directed graph further including an allocation meta-node pointing to one or more object allocation instruction nodes.

* * * * *